(12) United States Patent
Qiu et al.

(10) Patent No.: US 11,789,432 B2
(45) Date of Patent: Oct. 17, 2023

(54) METHOD FOR IDENTIFYING AND PARSING INDUSTRIAL CONTROL PROTOCOL BASED ON INDUSTRIAL GATEWAY

(71) Applicant: TIANJIN UNIVERSITY, Tianjin (CN)

(72) Inventors: Tie Qiu, Tianjin (CN); Xiaoyu Jiang, Tianjin (CN); Keqiu Li, Tianjin (CN); Jiancheng Chi, Tianjin (CN); Ning Chen, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 52 days.

(21) Appl. No.: 17/522,601

(22) Filed: Nov. 9, 2021

(65) Prior Publication Data
US 2022/0206473 A1 Jun. 30, 2022

(30) Foreign Application Priority Data
Dec. 31, 2020 (CN) .......................... 202011621527.8

(51) Int. Cl.
*G05B 19/418* (2006.01)
(52) U.S. Cl.
CPC ..... *G05B 19/4186* (2013.01); *G05B 19/4183* (2013.01); *G05B 19/41885* (2013.01)

(58) Field of Classification Search
USPC ......................................................... 700/17
See application file for complete search history.

(56) References Cited

U.S. PATENT DOCUMENTS 10,057,382 B2 * 8/2018 Sathyadevan .......... G06N 20/00
2017/0094033 A1 * 3/2017 Sathyadevan ........... H04L 67/12

FOREIGN PATENT DOCUMENTS

CN 212163361 U * 12/2020

OTHER PUBLICATIONS

Min et al., "Research on Multi-protocol Parsing in Intelligent Buildings", Jun. 1, 2020, IEEE, p. 710-715. (Year: 2020).*

* cited by examiner

*Primary Examiner* — Hien D Khuu
(74) *Attorney, Agent, or Firm* — Womble Bond Dickinson (US) LLP

(57) ABSTRACT

Disclosed is a method for identifying and parsing an industrial control protocol based on an industrial gateway. The industrial gateway captures, through a serial port and a network port, messages sent from a host computer and a lower computer to the industrial gateway, extracts features representing different protocol types and protocol fields from the messages, and identifies and parses the messages based on protocol character features.

1 Claim, 2 Drawing Sheets

METHOD FOR IDENTIFYING AND PARSING INDUSTRIAL CONTROL PROTOCOL BASED ON INDUSTRIAL GATEWAY

CROSS REFERENCE TO RELATED APPLICATION(S)

This patent application claims the benefit and priority of Chinese Patent Application No. 202011621527.8 filed on Dec. 31, 2020, the disclosure of which is incorporated by reference herein, in its entirety, as part of the present application.

TECHNICAL FIELD

The present disclosure relates to the technical field of computer communications, and in particular to a method for identifying and parsing an industrial control protocol based on an industrial gateway.

BACKGROUND ART

Industrial Internet of Things (IIoT) refers to the Internet of Things (IoT) technology in the industrial field. It is a technology that machines, computers and personnel can utilize advanced data analytics outcomes to achieve industrial intelligence. Sensors are installed on an industrial device and connected to interconnected networks to achieve data interworking and system interoperability of industrial resources, so as to improve industrial production efficiency and industrial resource utilization, optimize industrial manufacturing processes and technologies, and build a new industrial production system. At present, IIoT has been progressively applied to various production links in many industrial fields such as manufacturing, retail, general industry, and transportation, effectively improving the efficiency of enterprise collaboration.

An industrial gateway is an industrial-grade intelligent gateway designed to meet the industrial-grade standards and the needs of industrial users. It is a core component of the IIoT and industrial control systems (ICSs). In IIoT scenario, industrial sensing devices need to rely on an intelligent gateway to implement functions such as data collection, forwarding, transmission, edge computing, and protocol conversion. Based on the above function requirements, the gateway is required to serve as a bridge for serial informatization and automation. Connecting the preceding and the following, it parses an industrial control protocol used in a lower computer and interfaces to a network protocol used in a host computer at the same time to complete protocol conversion between sensors and preprocesses data before sending it to achieve secure and reliable data transmission.

Most industrial control networks are local area networks, with coverage of several kilometers and subject to interference from electromagnetic waves and mechanical vibrations. The industrial control networks have strict requirements for real-time control, and are distributed in factory's production workshops, assembly lines, greenhouses, buildings, and various traffic management systems, etc. Based on the above characteristics, the communication between the field network and the control network of the ICS, the communication between industrial control devices in the field network, and the communication between components in the control network often adopt the communication protocol specific to the ICS, that is, the industrial control protocol. Most of the currently used industrial control protocols are private protocols. Protocol formats can be customized, and there is no standard delimiter between fields, such that the standard format of the protocol is often unknown and it is difficult to parse the protocol messages directly. A study found that the efforts made on industrial control protocols in the existing related work are insufficient. Most of the efforts are made in simulation scenarios, and the number of supported protocols is smaller. For example, the work in "Industrial Control Intrusion Detection Model Based on S7 Protocol" can only support parsing of the S7 protocol, and the work in "Research on Multi-protocol Parsing in Intelligent Buildings" verifies the performance only in a simulation scenario.

SUMMARY

An object of the present disclosure is to overcome deficiencies in the prior art, providing a method for identifying and parsing an industrial control protocol based on an industrial gateway. This method can also be used to identify and parse protocols of a host computer and a lower computer, supports identification and parsing of dozens of industrial control protocols, and combines intelligent identification and parsing with manual intervention. In this way, protocol templates can be dynamically extended and supported protocol types can be constantly expanded to overcome difficulties in identifying and parsing unknown protocols.

The object of the present disclosure is achieved by the following technical solutions.

A method for identifying and parsing an industrial control protocol based on an industrial gateway is provided, where the industrial gateway captures, through a serial port and a network port, messages sent from a host computer and a lower computer to the industrial gateway, extracts features representing different protocol types and protocol fields from the messages, and identifies and parses the messages based on protocol character features; and specific steps are as follows:

step 1. Establishing, by the industrial gateway, serial communication with a sensing device and socket communication with a client, and determining a source of a current message based on amounts of data existing in two channels; and if the message comes from the lower computer, performing step 2; or if the message comes from the host computer, performing step 3;

step 2. Reading data from the serial port, where it is determined, based on that the message comes from serial communication, that a communication protocol used to transmit the current message is Modbus-RTU since currently only the Modbus-RTU protocol supports serial communication of the industrial gateway, and the current message is parsed based on a communication format of the Modbus-RTU protocol in a protocol field template library, to complete the protocol identification and parsing of the message;

step 3. Receiving, by the industrial gateway, the message from the client through the network port, splitting the message by layer according to a five-layer network model, obtaining a port number used by a transport layer, and matching a protocol type corresponding to a port based on the port number; and if the matching succeeds, that is, the port has a corresponding protocol, performing step 4; or if the matching fails, performing step 5;

step 4. Matching a parsing template corresponding to the industrial gateway—identified protocol type in the protocol field template library based on the identified protocol type, and parsing the message based on a parsing format corresponding to the parsing template, that is, a field dictionary;

step 5. Matching the message with templates in a protocol type template library; and if the matching succeeds, identifying that a protocol type of the message is a protocol type corresponding to a matched template, and performing step 4; or if the matching fails, performing step 6;

step 6. Marking the message as an unknown protocol message, sending a manual intervention request to the gateway, dispatching manual identification and parsing tasks to relevant personnel, and adding identification and parsing results as new templates to the protocol type template library and the protocol field template library; and step 7. repeating steps 2, 3, 4, 5, and 6 until there is no data in the channels.

Compared with the prior art, the technical solutions of the present disclosure bring about the following beneficial effects.

The present disclosure realizes intelligent identification and parsing of an industrial control protocol based on an industrial gateway. The industrial gateway, acting as a bridge, traces and analyzes in real time, through serial communication and socket communication, messages generated during industrial production. Through connections of the two communication modes, this solution is compatible with identification and parsing of protocols involving messages during communication between a host computer such as a computing platform and a lower computer such as an industrial sensing device, and promotes the industrial gateway in terms of protocol conversion to accelerate the implementation of the accurate communication between the host computer and the lower computer.

With the present solution, historical message data is mined, similarity between messages is measured based on a longest common subsequence (LCS), clustering may be performed, and a protocol type template library and a protocol field template library are generated based on clustering results. The two template libraries can be extended with the increase of message data. For this reason, the present solution achieves higher scalability compared with the existing solutions. Many existing solutions work well only for specific protocols. However, the present solution is able to identify and parse more than 40 industrial control protocols based on existing data, and the number of supported protocols can be further expanded. Because the template libraries involved in this solution are generated based only on message content without relying on prior knowledge, and message processing and template updating can be performed through manual intervention, this solution is not only suitable for identification and parsing of general industrial protocols, but also applicable to identification and parsing of custom protocols and unknown protocols, which compensates for the defect of the insufficiency of protocol types supported in related work. Meanwhile, this solution adopts a variety of identification and parsing schemes based on differences of applicable conditions, thereby speeding up protocol identification and parsing and guaranteeing accuracy of the result.

DETAILED DESCRIPTION OF THE EMBODIMENTS

Figure 1:
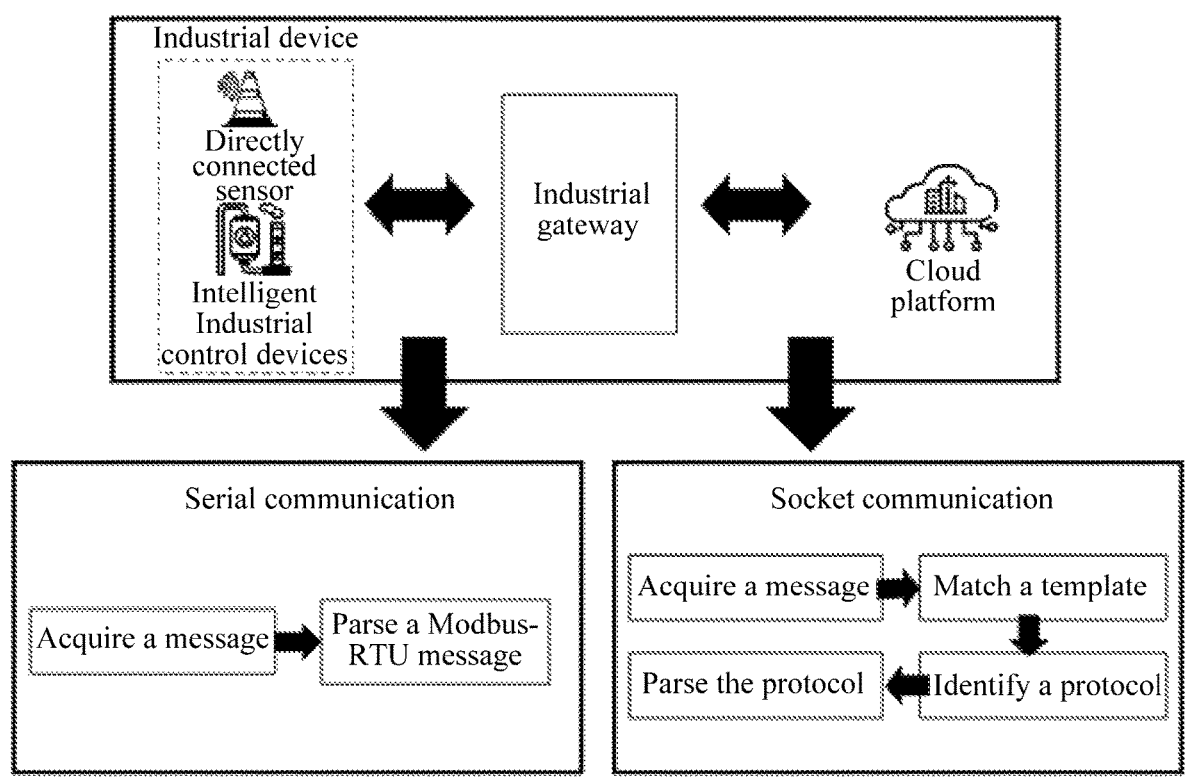
FIG. 1 is a principle diagram of the present disclosure.
Figure 2:
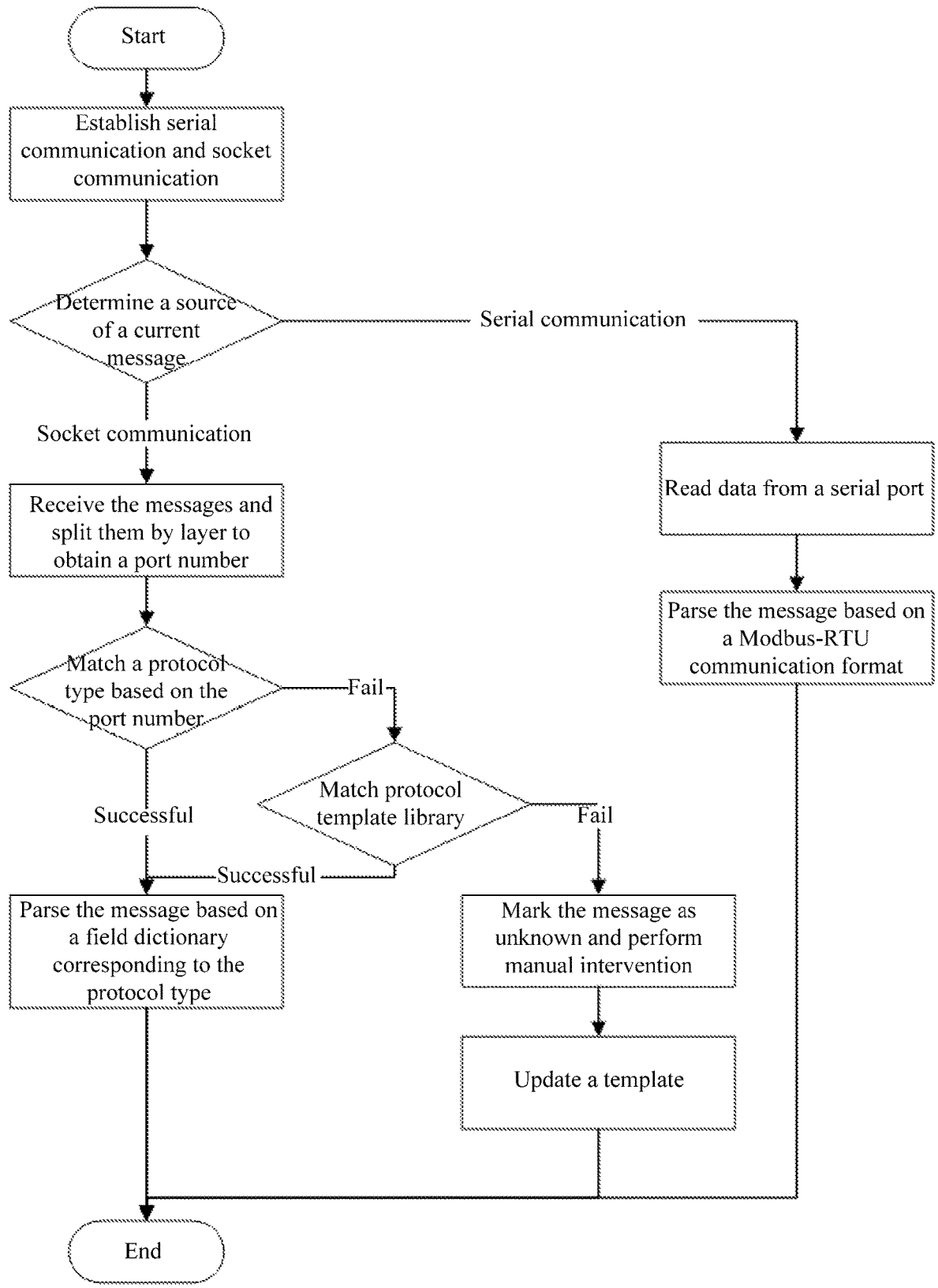
FIG. 2 is a flowchart of the operation of protocol parsing and identification according to the present disclosure.

The present disclosure is further described in detail below with reference to the accompanying drawings and specific embodiments. It should be understood that the specific embodiments described herein are merely intended to explain but not to limit the present disclosure.

Step 1: RS-485 and RS-232 serial ports of an industrial gateway are enabled, socket communication between a client (client side) and the industrial gateway (server side) is established, monitor data transmission channels of the serial ports and network ports at the same time, FIFO policy is adopted to process a message that is first transmitted to the industrial gateway, and a current communication mode of the industrial gateway is determined based on a source of the message. If the current communication mode is serial communication, go to step 2; or if current communication mode is socket communication, go to step 3.

Step 2: an amount of data waiting to be received is obtained from the serial port, messages of the corresponding data amount is read, a channel from which messages are captured is released, and a next data transmission mode is determined. For a message captured in the serial port, since it is generally believed that Modbus-RTU protocol is the only industrial control protocol supporting serial communication, so the protocol type to which the currently captured message belongs can be identified as the Modbus-RTU by the communication mode. A protocol field template library is searched for a message communication format corresponding to Modbus-RTU, and the message is parsed according to a matched field template.

Step 3: a message sent from a socket client is monitored and captured by the industrial gateway used as the server side, a prompt is sent to the client after the message is successfully received, and the communication is cut off The captured message is split in sequence according to a five-layer architecture of the network, including application layer, transport layer, network layer, data link layer, and physical layer, a port number used by TCP/UDP is obtained at the transport layer, and a protocol type corresponding to the port number is matched in a port dictionary; if the matching succeeds, go to step 4; or if the matching fails, go to step 5.

Step 4: a network message is split based on the five-layer architecture. The message content above the application layer is parsed based on a general format of network protocols, and a RAW part of the application layer is parsed separately. A parsing template corresponding to the identified protocol type is matched in the protocol field template library based on the identified protocol type, the longest common subsequence LCS is taken as a similarity measure basis, and the message is parsed based on the parsing format corresponding to a template having the highest similarity with the message.

Specifically, a template matching formula may be in the form of equation (1).

$$T_{match} = \max\{Similarity_{lcs}(i) \mid i \in T\} \quad (1)$$

Where $T$ and $T_{match}$ represent a template list and a template matching result respectively; and $Similarity_{lcs}(i)$ represents a similarity measure result between a message and the i-th template in T.

Specifically, a similarity measure formula may be in the form of equation (2).

$$Similarity_{lcs} = \frac{l_{LCS}}{(l_t + l_m)/2} \quad (2)$$

Where t and m represent a template and a message respectively; $l_t$ and $l_m$ represent a length of the template and a length of the message respectively; and $l_{LCS}$ represents the length of the LCS between the message m and the template t.

Step 5: similarity between the message and messages in a protocol type template library is measured. If a measure result reaches a threshold range, it is considered that the message is matched with a template, the message is marked as a protocol type corresponding to the template, going to step 4; if the measure result does not reach the threshold range, it is considered that the matching fails, going to step 6.

Step 6: a message whose protocol type is still not identified is marked as an unknown message, the message is determined as an unknown protocol message or a custom protocol message, and a manual intervention request is sent to the industrial gateway. The industrial gateway performs manual analysis on the message: first determining whether the message is either an error message or an attack message; if yes, discarding the message; and if no, performing manual identification and parsing, and adding results as new templates into the protocol type template library and the protocol field template library.

Step 7: After completing the parsing of a single message, steps 2, 3, 4, 5, and 6 are repeated, until there is no data in the two channels within a waiting time range, and at this time, it is considered that there is no longer a need to identify and parse a protocol, and the related processes is suspended.

The present disclosure is not limited to the embodiments described above. The above description of the specific embodiments is intended to describe and illustrate the technical solutions of the present disclosure, and the above specific embodiments are only illustrative but not restrictive. Without departing from the ideas of the present disclosure and the protection scope of the claims, those of ordinary skill in the art can make many specific changes under the enlightenment of the present disclosure, and all these changes fall within the protection scope of the present disclosure.

What is claimed is:

1. A method for identifying and parsing an industrial control protocol based on an industrial gateway, wherein the industrial gateway captures, through a serial port and a network port, messages sent from a host computer and a lower computer to the industrial gateway, extracts features representing different protocol types and protocol fields from the messages, and identifies and parses the messages based on protocol character features, the method including steps comprising:

step 1, establishing, by the industrial gateway, serial communication channel with a sensing device and socket communication channel with a client, and determining a source of a current message based on respective amount of data existing in the two channels; when determining the source of the current message originates from the lower computer, proceeding to step 2; and when determining the current message originates from the host computer, proceeding to step 3;

step 2, reading data from the serial port of the serial communication channel; determining, based on that the current message originates from the serial communication channel, that a communication protocol used to transmit the current message is Modbus-RTU protocol since the serial communication channel of the industrial gateway currently only supports the Modbus-RTU protocol, parsing the current message based on a communication format of the Modbus-RTU protocol in a protocol field template library to complete the protocol identification and parsing of the current message, and proceeding to step 7;

step 3, receiving, by the industrial gateway, the current message from the client through the network port of the socket communication channel, splitting the current message by layer according to a five-layer network architecture, obtaining a port number used by a transport layer, and matching a protocol type corresponding to a port based on the port number; when the matching succeeds, the port has a corresponding protocol, proceeding to step 4; and when the matching fails, proceeding to step 5;

step 4, matching a parsing template corresponding to the protocol type in the protocol field template library based on the protocol type identified by the industrial gateway, parsing the current message based on a parsing format corresponding to the parsing template, that is, a field dictionary, and proceeding to step 7;

step 5, matching the message with templates in a protocol type template library; when the matching succeeds, identifying the current message as a protocol type corresponding to the template, performing step 4; and when the matching fails, proceeding to step 6;

step 6, marking the current message as an unknown protocol message, sending a manual intervention request to the gateway, dispatching manual identification and parsing tasks to relevant personnel, adding identification and parsing results as new templates into the protocol type template library and the protocol field template library, and proceeding to step 7; and step 7, repeating step 1 until there is no data from the respective amount of data existing in the two channels.

* * * * *